(12) United States Patent
Swvigaradoss et al.

(10) Patent No.: US 11,386,263 B2
(45) Date of Patent: Jul. 12, 2022

(54) AUTOMATIC GENERATION OF FORM APPLICATION

(71) Applicant: ServiceNow, Inc., Santa Clara, CA (US)

(72) Inventors: Jebakumar Mathuram Santhosm Swvigaradoss, Hyderabad (IN); Harshvardhan Prasad, Hyderabad (IN); Molugu Sainithin, Hyderabad (IN); Barashnabin Roy, Bhilai (IN); Sakshi Kataria, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/900,724

(22) Filed: Jun. 12, 2020

(65) Prior Publication Data

US 2021/0390251 A1    Dec. 16, 2021

(51) Int. Cl.
 *G06F 40/174* (2020.01)
 *G06V 30/414* (2022.01)
 *G06V 30/416* (2022.01)

(52) U.S. Cl.
 CPC ......... *G06F 40/174* (2020.01); *G06V 30/414* (2022.01); *G06V 30/416* (2022.01)

(58) Field of Classification Search
 None
 See application file for complete search history.

(56) References Cited

U.S. PATENT DOCUMENTS

| | | | | |
|---|---|---|---|---|
| 10,114,800 | B1* | 10/2018 | Huang | G06K 9/4685 |
| 10,474,745 | B1* | 11/2019 | Burd | G06F 16/248 |
| 2004/0205533 | A1* | 10/2004 | Lopata | G06F 40/174 |
| | | | | 715/226 |
| 2009/0018851 | A1* | 1/2009 | Greenfield | G06Q 50/01 |
| | | | | 705/319 |
| 2014/0258825 | A1* | 9/2014 | Ghosh | G06K 9/00442 |
| | | | | 715/222 |
| 2015/0248392 | A1* | 9/2015 | Watanabe | G06F 16/93 |
| | | | | 715/226 |
| 2018/0018311 | A1* | 1/2018 | Mukherjee | G06Q 40/123 |
| 2018/0165255 | A1* | 6/2018 | Gafford | G06F 40/174 |
| 2019/0065455 | A1* | 2/2019 | Dua | G06F 40/143 |
| 2019/0087463 | A1* | 3/2019 | Dua | G06F 16/93 |
| 2019/0286691 | A1* | 9/2019 | Sodhani | G06N 3/0445 |
| 2020/0311192 | A1* | 10/2020 | Kumar | G06K 9/00449 |

OTHER PUBLICATIONS

He, Xiaochen, and Nelson Hon Ching Yung. "Corner detector based on global and local curvature properties." Optical engineering 47, No. 5 (2008): 057008. (Year: 2008).*

* cited by examiner

*Primary Examiner* — Frank D Mills
(74) *Attorney, Agent, or Firm* — Van Pelt, Yi & James LLP

(57) ABSTRACT

An input document data is received. The document data is analyzed to automatically identify one or more response fields and one or more corresponding text labels laid out in the input document data. An application configured to provide to users the one or more response fields and the one or more corresponding text labels and receive inputs to the response fields from the users that are recorded in a persistent computer storage is automatically generated.

20 Claims, 10 Drawing Sheets

FIG. 6

| Label | Type | Mandatory? | Reference | Include Column |
|---|---|---|---|---|
| Name of Post (Applying For) | text | ◄ ○ ► | ◄ ► | ☑ |
| Name of Candidate | text | ◄ ○ ► | ◄ ► | ☑ |
| Gender | reference | ◄ ○ ► | gender_218_list ◄ ► | ☑ |
| Father's or Husband Name | text | ◄ ○ ► | ◄ ► | ☑ |
| PHOTO | reference | ◄ ○ ► | sys_attachment ◄ ► | ☑ |
| Date of Birth | date | ◄ ○ ► | ◄ ► | ☑ |
| District Domicile | text | ◄ ○ ► | ◄ ► | ☑ |
| Urban | reference | ◄ ○ ► | none ◄ ► | ☑ |
| Rural | reference | ◄ ○ ► | none ◄ ► | ☑ |
| CNIC No | text | ◄ ○ ► | ◄ ► | ☑ |
| Contact No | text | ◄ ○ ► | ◄ ► | ☑ |
| Religion | text | ◄ ○ ► | ◄ ► | ☑ |

FIG. 7

Table Name: Educational Qualification Table 2020s

Found 5 existing table(s) with the same information

| Label | Type | Mandatory? | Reference | Include Column |
|---|---|---|---|---|
| S. No | text | ◀ ▶ ○ ◀ ▶ | | ☑ |
| Name of Degree | text | ◀ ▶ ○ ◀ ▶ | | ☑ |
| Year of Passing | text | ◀ ▶ ○ ◀ ▶ | | ☑ |
| Board or University | text | ◀ ▶ ○ ◀ ▶ | | ☑ |
| Grade or Division or CGPA | text | ◀ ▶ ○ ◀ ▶ | | ☑ |
| Specialization (If Any) | text | ◀ ▶ ○ ◀ ▶ | | ☑ |

AUTOMATIC GENERATION OF FORM APPLICATION

BACKGROUND OF THE INVENTION

Analyzing user collected data across different user response forms is a complex technical challenge and can quickly become difficult if not impossible. Traditionally, users are provided with a form document and user data is collected from user responses. The user data can be collected from a vast number of different users using a wide variety of different forms, each potentially including both different and similar questions. Moreover, even when questions are similar, different users can respond with answers in vastly different formats, especially when presented with different forms such as an employment form and job history form. It is a technical challenge to not only collect user responses but to also relate the collected user responses from different users when submitted via different forms. Therefore, there is a need to automatically generate and distribute custom forms to users that are compatible with one another and to correlate the responses collected from users to the different forms.

BRIEF DESCRIPTION OF THE DRAWINGS

Various embodiments of the invention are disclosed in the following detailed description and the accompanying drawings.

FIG. 6 is a diagram illustrating an example of a physical form document.

FIG. 7 is a diagram illustrating an embodiment of an administrator user interface for creating a digital form application.

FIG. 8 is a diagram illustrating an embodiment of an administrator user interface for creating a table in a digital form application.

FIGS. 9A and 9B are diagrams illustrating an embodiment of a user interface for an automatically generated computer form application.

DETAILED DESCRIPTION

Figure 1:
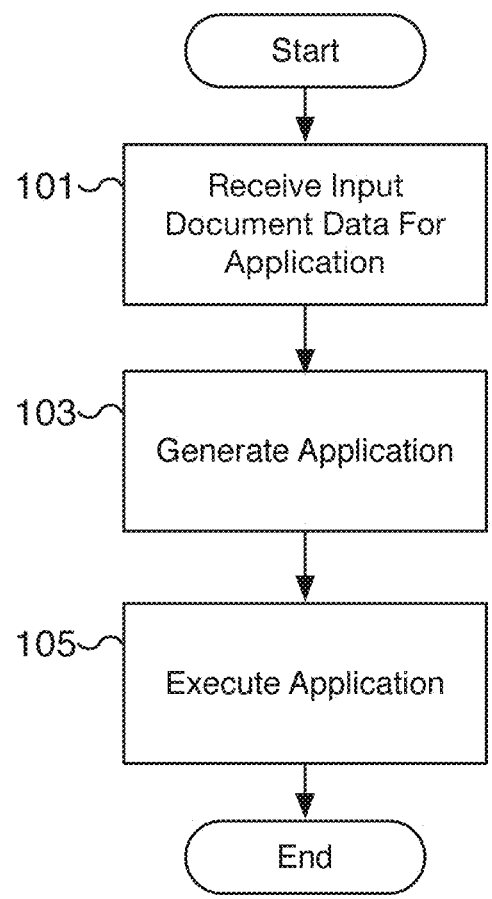
FIG. 1 is a flow chart illustrating an embodiment of a process for automating the collection of form data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for automatically generating and distributing compatible custom forms to users is disclosed. By enforcing compatibility across different custom forms, the responses to automatically generated forms can be correlated. This correlation allows relationships between the responses to be enforced as well as analyzed. The consistency and quality of the user data is significantly improved in part because the form responses require cross-referencing responses from different forms. For example, an employment form and job history form are different forms but can ask for overlapping information. Both forms may include requests for former employer information. An employment form may ask for a former employer's contact information but a job history form may additionally ask for information relating to a former immediate supervisor. Both forms may ask for a previous job title. A first form may ask for the user's level of seniority while a second form may ask for years of experience. Although requests for the user's former employer information are similar, the responses can be very different. For example, experience can be expressed using a variety of different descriptions such as job title experience (e.g., intern software engineer, junior software engineer, senior software engineer, etc.), years of experience (e.g., less than 1 year, between 2-3 years, 4-6 years, 7+ years, etc.), job ranking (software engineer 1, software engineer 2, software engineer 3, etc.), or a number of other metrics.

The disclosed invention allows enforcement of compatibility across different forms in part by identifying relationships between form responses from different forms. For example, both an employment form and job history form may require job experience responses use the same response format. In various embodiments, potentially unrelated standard and/or custom forms are converted to compatible computer form documents with correlated response fields. Response fields for different forms are automatically generated to reference the same data store. Moreover, a data type is determined for each response field. For example, instead of allowing free form responses, a job experience response field may be populated with approved responses from which to select from. As another example, a response field for a date of birth is restricted to a date response. Using the disclosed techniques, a computer form document is automatically generated and provided to users, for example, by providing a unique Uniform Resource Locator (URL) with login credentials. The types of responses different users can provide are restricted to match the data types of the response fields. Valid responses from the different standard and/or custom forms are collected and stored in a shared persistence storage. In various embodiments, the process allows for user collection from diverse requests while enforcing responses to specific formats compatible across different forms. In some embodiments, the process further allows an administrator to customize each form by adding/removing response fields and by selecting a relationship to an existing data store, such as a database table, for response fields.

Typically, users enter data into standard and/or customized physical or digital forms. Standard forms can include government published forms such as employment forms, income tax forms, and benefits forms, among others. Different types of data collection forms including different types of customized forms can include employment forms, surveys, expense reports, and resumes, among others. Moreover, different variations of each type of form are typically required. For example, one expense report may require different fields compared to another. Often data collection forms need to be customized for a particular use case and new customized forms need to be created when new use cases arise. Traditionally, this data collection is done manually by entering the data by hand or in some cases by creating a custom application for online or digital data collection. Both methods are time consuming, tedious, and can be prone to error. Moreover, the different forms and their responses are not correlated.

Starting with a physical or digital form, a computer form application is automatically generated that allows users to complete a digital version of the form. Users are provided with the automatically generated application and their input to the application is collected as the form data. In some embodiments, the document data of the original form is analyzed, for example, by first digitizing a paper form and then analyzing the input document data for text labels and corresponding response fields. The identified text labels and response fields are used to automatically generate a user application. In some embodiments, the response fields are first mapped to existing data storage entries, such as one or more existing database tables and fields. For example, potential matches for a response field are shown to an administrator who selects the correct database table and/or field to match a response field to. In some embodiments, a data type is automatically determined for a response field. For example, a response field may be a text string, an integer, a floating point number, a date, a category, a name, a zip code, or another determined data type. In some embodiments, the administrator is presented with an automatically generated view with the identified response fields. The administrator can add and/or remove response fields and modify the data types of the fields. Once the fields are verified by the administrator, an application that allows a user to complete a digital version of the form is automatically generated. In some embodiments, the application is a web application accessible via a web browser. For example, the application is automatically generated and a corresponding URL for the generated application is provided to users to access the application. In some embodiments, the application is a desktop or mobile application. In various embodiments, a user can input user data into the automatically generated application. The received input is captured and stored in a persistent computer data store. For example, the received input can be written to cloud-hosted data storage as one or more entries in a corresponding database table.

In some embodiments, a method comprises receiving an input document data. For example, a physical form such as a paper form is digitized. The paper form includes text labels describing fields for users to complete. For example, a name label can have a corresponding blank response field for a user's first, middle, and last name and a date of birth label can have a corresponding response field for a user's month, day, and year of birth. A digitized version of the blank form is provided as the input document data. For example, the paper form can be scanned or a photo can be taken of the paper form. In some embodiments, the paper form is a hand drawn form. The input document data is analyzed to automatically identify one or more response fields and one or more corresponding text labels laid out in the input document data. For example, text labels in the scanned form are identified along with their corresponding response fields. As one example, a text label for a user's name is matched with an identified name response field. As another example, a date of birth text label is identified and matched with an identified date of birth response field. In some embodiments, the data types associated with the identified labels and fields are determined. For example, a name is a name data type that can include a first, middle, and last name. As another example, a date data type can include month, day, and year components. In various embodiments, the identified response fields can be matched with existing fields, such as existing fields in a preexisting database. For example, a country label and response field can match a previously populated database table with recognized countries. Each row of the preexisting database table can be populated with an existing country name.

In some embodiments, an application configured to provide to users the one or more response fields and the one or more corresponding text labels and receive inputs to the response fields from the users is automatically generated. For example, a computer application is automatically generated using the identified text labels and response fields. A user is presented with a user interface view displaying the text labels with corresponding response fields to complete. A user inputs their responses into the application, for example, by typing their responses when interacting with the application's user interface. In some embodiments, the application is a web application and/or mobile device application. The received inputs to the response fields from the users are recorded in a persistent computer storage. For example, the user inputted responses are saved in a persistent database such as a cloud-hosted persistent data storage. In some embodiments, each response field corresponds to an entry in a database table.

FIG. 1 is a flow chart illustrating an embodiment of a process for automating the collection of form data. For example, starting with a form document, an application is automatically generated to collect user data responses that can be stored in a persistent data storage. The generated application can also interface with existing data stores such as existing remote databases to leverage existing data relationships. Instead of requiring manual data entry or a programmer to design and create a custom application for every new form, using the process of FIG. 1, applications can be automatically generated using input document data such as a sample form document.

At 101, an input document data for a form application is received. For example, a digitized version of a form document is received. In some embodiments, the digitized version is a scanned version or a photo taken of a paper form or a pdf version or similar format of a digital form document. In some embodiments, the original form is hard drawn, for example, on paper or another surface such as a whiteboard. In some embodiments, the input document data is based on a digital image of a form document created using a computer application. An image of the form document can be recreated using a graphics image editor and/or may be drawn with a pen tablet or similar hardware. The digital form input document data may be a screenshot of a diagram created using an application such as Microsoft Word, Microsoft PowerPoint, and/or any mockup/wireframe tool. The input document data may include multiple pages corresponding to multiple pages of a form document. In some embodiments, the input document data corresponds to a digital image of each form document page. In some embodiments, the input document data is received in part by having an administrator or similar user upload the input document data to a hardware server.

At 103, a computer form document application is generated. Using the input document data received at 101, a computer application is generated that allows users to digitally enter data corresponding to response fields of a form document. The input document data is analyzed to identify labels and corresponding response fields. Examples of response fields and their corresponding labels include fields and labels to collect a name, date of birth, date, address, job title, etc. The response fields can be automatically associated with a particular data type, such as a text string, a number, a positive number, a Boolean, a date, a date of birth, a currency amount, an address, etc. In various embodiments, different types of data types can be supported and can include very specific and customized data types. For example, a bank account type field may be limited to an approved list of account types such as checking and savings accounts. Although additional account types can be added or removed, the data type enforces that the value for the response field must be from the approved list of bank accounts.

In some embodiments, the identified fields and labels are mapped to existing data and data types. For example, a country field can be mapped to an existing country data type with possible country values. The mapping may be based on mapping the identified fields and labels to existing data such as existing database tables and/or database table fields. For example, a country text label and response field can be mapped to a country database table where each row of the table includes a name of a different country as a text string. In some embodiments, an administrator provides input to select the appropriate mapping. For example, an administrator selects from potential matches that are automatically identified. In some embodiments, before the application is generated, an administrator can modify the form analysis results, for example, by adding and/or removing response fields and/or mapping fields to existing sources and/or data types. Once verified, a custom computer form application is generated. In some embodiments, a backing data store, such as a backend database with corresponding database tables, is created for storing responses to the response fields. For example, a database schema or similar definition for organizing responses to the response fields is generated along with any additional table metadata. The application can use the schema to initialize the data storage for storing application responses.

In some embodiments, the computer application generated is a web application. Users can access the generated application via a provided URL to submit user data responses for collection. Once collected using the application, the user data can be stored in a persistent computer storage, such as a database. In some embodiments, the generated application utilizes a different platform, such as a desktop device, a kiosk, a mobile device, or another appropriate platform.

In some embodiments, the automatically generated form output is any generic form, widget, record producer, seismic form, survey, editable PDF, or another format for automating the collection and cross-referencing of user data.

At 105, the computer form application is executed. For example, database tables corresponding to form response fields are created and the application is launched. In some embodiments, the application is run on a remote accessible server such as a web and/or application server and is accessible via a network connection. In various embodiments, the application is accessible by users via a web browser using a location identifier that may include at least a URL for the application. Once users access the running application, they are presented with a digital form for inputting form responses. Users can then enter input responses via the application for the requested fields. The results are captured and stored in a persistent computer storage such as a network accessible database and/or data storage. The results stored at the persistent computer storage can be retrieved and/or analyzed as needed.

Figure 2:
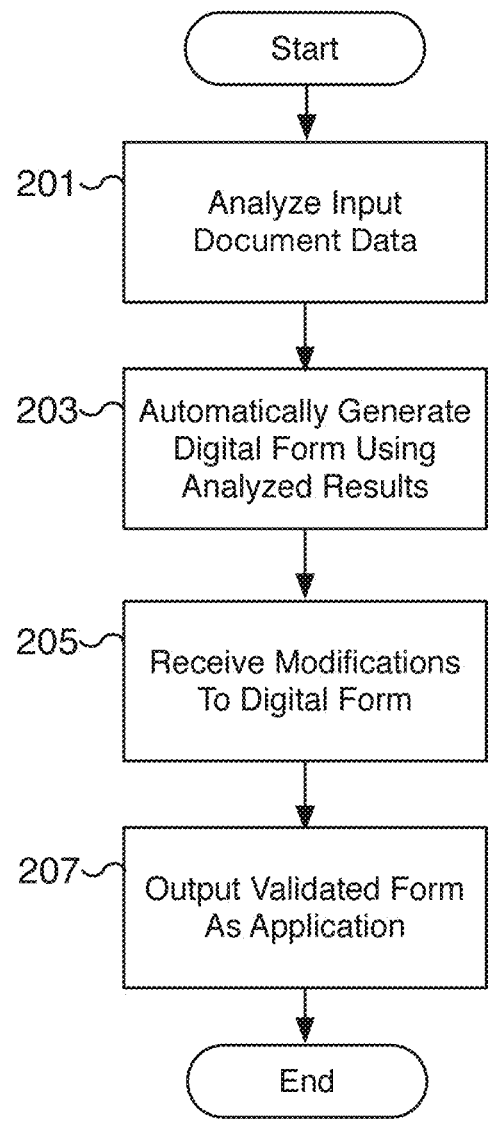
FIG. 2 is a flow chart illustrating an embodiment of a process for automatically generating a computer form application.

FIG. 2 is a flow chart illustrating an embodiment of a process for automatically generating a computer form application. For example, a form document is converted into a computer form application that significantly improves the workflow for the collection of user data. In particular, the workflow for collecting user data with custom forms is significantly more efficient at least in part by utilizing digital user data collection with a custom computer application that is automatically generated. In various embodiments, the form application is generated using input document data. For example, the input document data may be a digital version of a physical form. In some embodiments, the process of FIG. 2 is performed at 103 of FIG. 1.

At 201, an input document data is analyzed. For example, the input document data is analyzed to automatically identify one or more response fields and one or more corresponding text labels laid out in the input document data. Example fields and response fields can include a name, address, education, date of birth, age, etc. Because the forms are often customized, the number and type of response fields and corresponding text labels can vary significantly. In some embodiments, data not corresponding to response fields is also identified. For example, document title, sub-titles, headers, footers, images, photos, etc. can be automatically identified. The identified non-response field data can be used in the generation of the computer form application. For example, a form title and company logo can be identified from the input document data and replicated in a view of the computer form application.

In some embodiments, a data type is determined for each identified response field. For example, a name field may be configured to accept a string data type, an age field may be configured to accept a positive integer data type, a date of birth field may be configured to accept a date data type, etc. The data types supported can vary and can be customized as appropriate. In some embodiments, a response field is mapped to existing data, such as an existing database table. For example, a university response field can be mapped to a university table that includes data related to different universities and their names. The table can also contain additional university data such as location, address, contact information, etc. for each university entry that may not be requested by the response field or form. In some embodiments, existing data sources are searched using at least in part the corresponding text label of the response field.

In some embodiments, a group of identified response fields are mapped to a database table. As one example, a particular form can include a section with multiple blank entries to allow a user to submit the user's job experience from multiple different jobs. Each blank entry can include a response field for the name of an employer, a designation (or job title), an employer address, and a length of experience. In various embodiments, the job experience section of the form is analyzed and mapped to a job experience table that includes the relevant fields for employer name, designation, address, and total experience.

At 203, a digital form is automatically generated using the analyzed results. For example, a sample digital form is generated using the identified response fields and text labels. In some embodiments, each response field of the digital form has a data type. The response fields in the form may also be linked to existing data sources. For example, a university table and/or field of a university table can be linked to a university response field. In some embodiments, users submitting a response to the university response field must select an existing university name that exists in the university table. In some embodiments, multiple potential data references are identified and the generated digital form includes options to select a source from the potential data references. In some embodiments, a default reference is selected but can be modified at step 205.

At 205, form modifications to the digital form are received. For example, an administrator reviews and modifies the automatically generated digital form. In the event the administrator wants to make revisions, the administrator can modify the generated digital form. In some embodiments, modifications include adding and/or removing response fields, changing text labels, changing data types associated with response fields, and/or changing the mapping of response fields to existing data stores, among others. In some embodiments, an administrator is presented with a user interface for reviewing and modifying the generated digital form. Once acceptable, the administrator can verify the reviewed digital form is correct and a computer form application can be generated and outputted at step 207. In some embodiments, step 205 is optional and a form application is automatically generated without administrator modifications.

At 207, a validated form application is outputted. For example, using the verified digital form configured at 205, a computer form application is automatically generated. In some embodiments, the generated application is a web application that can be hosted on a web and/or application server and is accessible via a network connection. The application may utilize a remote data store for persistent storage. For example, a database backend may be used to store collected user data captured by the application. In various embodiments, other application platforms are appropriate as well and may be utilized as an alternative or in addition to a web application. For example, other platforms include mobile platforms, desktop platforms, kiosk platforms, and/or another appropriate platform. The different platforms may utilize the same persistent computer storage but implement a client interface differently.

In some embodiments, persistent computer storage utilized by the generated computer form application is configured as part of step 207. For example, one or more database tables may be created in a network database server for storing collected user responses. In some embodiments, the database or corresponding data store is created at a later time such as when the application is executed.

Figure 3:
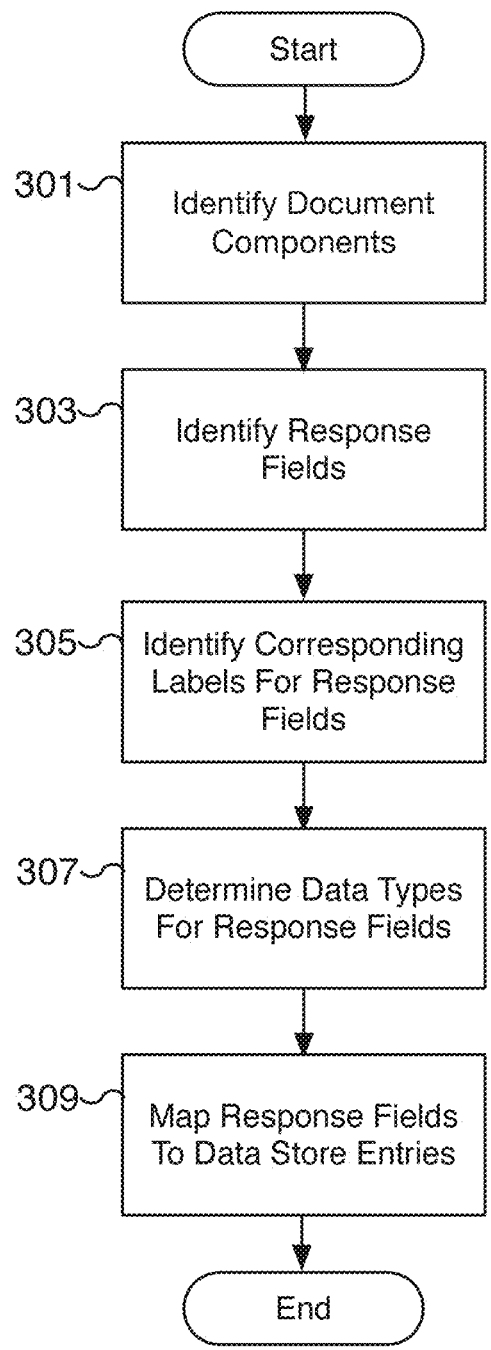
FIG. 3 is a flow chart illustrating an embodiment of a process for automatically analyzing an input document data.

FIG. 3 is a flow chart illustrating an embodiment of a process for automatically analyzing an input document data. For example, the process of FIG. 3 may be utilized to identify response fields and corresponding text labels within a physical form document for converting the form to a computer form application. In some embodiments, the process of FIG. 3 is performed at 201 of FIG. 2.

At 301, document components are identified. For example, different relevant components of the document data are identified and separated from non-relevant components. For example, response fields and corresponding text labels are identified. In some embodiments, non-response text labels such as headers, titles, sub-titles, text descriptions, captions, etc. are identified. Non-response text labels may correspond to directions or instructions for the user. Non-response image components such as logos, photos, images, etc. can be identified as well. In various embodiments, the input document data is analyzed and different components within the document data are identified for further processing. In some embodiments, the identification of document components is performed using an image analysis of the input document data. In some embodiments, one or more document components may already be identified by the format of the input document data, for example, by relevant metadata included in the input document data.

In various embodiments, the image analysis includes performing object character recognition to identify text. For example, in an initial pass, all text in the form document is identified using an OCR service. Once identified, the text is removed and the remaining input document data is processed to identify remaining document components, such as response fields. The response fields may include rectangular input boxes, check boxes, radio buttons, sequence of underscores, search fields, date fields, reference fields, tables, etc. In various embodiments, the response fields are detected by identifying the shape of the field. Once the different components are identified, they can be classified as a non-response field, a response field, a text label, or another document component type. Some formats of document components, such as response fields and corresponding labels, require further processing.

In some embodiments, document components including response fields are identified by extracting features using a modified version of the Hough transformation. For example, each black pixel in a white background is identified and fit into a line equation in polar form. For a particular rho and theta from the origin, the number of points that exist in that line is counted and stored in an accumulator matrix containing all possible rho and theta values. A determination is made for a particular theta and rho value pair whether the count of the points in the corresponding line equation exceeds a threshold value. In the event the threshold value is met, the points are determined to be part of a line with the particular corresponding rho and theta position. In some embodiments, an implementation of the Hough transformation takes all global maxima above a particular defined threshold. In various embodiments, the document components are identified by extracting features using another technique such as an iterative end-point fit algorithm. For example, pixels of an image are approximated to polygonal curves using a Ramer-Douglas-Peucker algorithm.

To improve results for a variety of input document data including data corresponding to hand-drawn lines and images with short bursts of straight printed lines, in some embodiments, the local maxima of every angle is extracted individually. This technique improves the quality of the document component analysis and significantly reduces the amount of noise while improving the ability to identify the outline of shapes. All local maxima of an angle are in close proximity in rho to the local maxima of the closest angles. This form streaks in the heat map of the accumulator matrix. The outer streaks run through 180 degrees and represent the convex outline of a shape. The inner streaks may be smaller and represent the concave outlines of the shape. If only the outline is detected with no inner streaks, a determination is made that the shape is a convex shape. Once all shapes in the input document data are identified, the shapes are classified to identify the particular component type, such as a radio button, a check box, or a text-box, etc.

In various embodiments, different tolerance levels with respect to the changes in angles can be defined to process different types of images. For example, for hand drawn images, an appropriate tolerance level for the changes in angles is defined. The tolerance level is raised to allow for lines that are not perfectly straight. For every streak which represents a continuous line, a maxima in the tolerance level of the angle can be configured. For example, using a tolerance level such as 20 degrees, on average, changes of up to 20 degrees are allowed for corresponding points to still be considered part of a single straight line. In some embodiments, concave shapes are identified by proceeding in a cyclic order from one line to the next and checking all angles and removing noise. As an initial pass, for a hand-drawn form document, these shapes are marked as placeholders. Once all shapes in the input document data are identified, the shapes are classified to identify the particular component type, such as a radio button, a check box, or a text-box, etc.

In various embodiments, table document components are identified by approximating the contour shape of the table. The identification of the table contour allows a table with multiple response fields to be identified with improved accuracy. In some embodiments, the contour is identified using an iterative end-point fit algorithm such as the Douglas-Peucker algorithm. In some embodiments, the various techniques are implemented in part by using a real-time computer vision library such as OpenCV.

At 303, response fields are identified. For example, response fields corresponding to portions in the input document data for users to enter responses are identified from the components identified at 301. Example response fields for collecting user responses include blank fields (or a sequence of underscores), boxes, checkmark targets (or checkboxes), radio buttons, search fields, date fields, reference fields, tables, and selection fields, among others. For example, a name text label may be followed with a blank field depicted as a long underscore and is intended for collecting a user's name. As another example, an empty checkmark target can be marked by a user for denoting a bank account is a checking account.

In some embodiments, the response field is a selection response field that allows the user to select from the provided response. For example, a list of possible answers is provided and the user can select a single response, select multiple responses, rank the responses, or answer using another response format, depending on the type of selection response field. In some embodiments, a single exclusive multiple-choice selection response field provides multiple responses but a user can only select a single response. A non-exclusive multiple-choice selection response field provides multiple response options and more than one (non-exclusive) response can be selected by the user. For a ranked selection response field, a user ranks the provided responses in order, for example, by numbering the choices. In various embodiments, selection response fields may utilize checkmark targets (or checkboxes), radio buttons, or another appropriate user interface element to display potential selection choices.

In some embodiments, response fields are grouped together to form a larger collective response. For example, information related to a former employer for an employment history response may include responses for the name of the employer, designation (or title), address, and the total time of the job experience. Each response field for the collective response is identified and can be grouped together. In some embodiments, the collective response is identified as a table document component.

In some embodiments, multiple response fields are determined to be a table. For example, a group of response fields for entering multiple employment history entries is identified as a table for collecting multiple entries of the same type. As another example, a response field requesting a list of classes previously taken is identified as a table for collecting multiple class responses.

At 305, corresponding labels for response fields are identified. For example, corresponding labels for the response fields identified at 303 are identified from the components identified at 301. In some embodiments, the labels are text labels. For example, the text label "Name of Candidate:" may precede and correspond to a response field for a user's name. Similarly, text labels "Urban" and "Rural" may be associated with empty checkmark target response fields. In various embodiments, a corresponding label is identified for each response field identified at 303 using spatial rules. For example, a response field and the nearest label positioned to the left or above the response field are mapped as a key value pair. Other spatial rules can be implemented as appropriate and may vary depending on the response field type.

In some embodiments, labels corresponding to collective responses and/or tables are identified. For example, a collective label "Educational Qualifications" is identified and corresponds to a table for field responses. Moreover, each entry in the table can include multiple labels with corresponding response fields. For example, each entry can include multiple text labels such as "Name of Degree," "Year of Passing," "Board/University," "Grade/Division/CGPA," and "Specialization (If Any)" text labels with corresponding response fields.

At 307, data types for response fields are determined. For example, a data type for each response field is determined at least in part by analyzing the response field and text label. For example, in some embodiments, the text label is parsed to determine keywords and matched with data types associated with the keywords. The text "name" may be associated with a string type whereas the text "age" may be associated with a positive integer type. Similarly, the text "Date of Birth" may be associated with a date type. In some embodiments, the response field is utilized as well to help determine the data type. For example, an empty checkmark target response field may be associated with a Boolean type. In some embodiments, the data type determination includes identifying the response field as being part of a table.

In various embodiments, the supported data types are configurable and can be complex and include multiple components. For example, supported data types can include text (or string), various number formats, date, currency, temperature, weight, and distance data types, among others. Recognized data types can also include component data types, such as an address component, a date component, and a time component data type, among others, where the component data type includes multiple component parts. For example, an address component data type can include a street number, a street name, a city, a county, a state, and a country component. A time component data type can include an hour, minute, second, millisecond, and time zone component.

At 309, response fields are mapped to existing data stores. For example, existing data stores such as database tables are searched to identify relationships between the tables and/or table fields with response fields, corresponding labels, and tables. In some embodiments, the text label is parsed to determine keywords and matched with database table and/or field names. A candidate list of existing data stores is determined. For example, in some embodiments, candidate data stores for a "name of employer" text label and corresponding response field can include database tables named "employers," "companies," and "businesses." In various embodiments, the candidate reference data stores are ranked to determine the closest matching reference. For example, a confidence score of a similarity matching metric is determined for each reference data store and used to rank the reference data stores.

In some embodiments, each response field of a collective response is used to determine whether an existing database table is a match. For example, for a collective response to reference an existing data store, the existing database table must include a corresponding field for each response field of a collective response.

Figure 4:
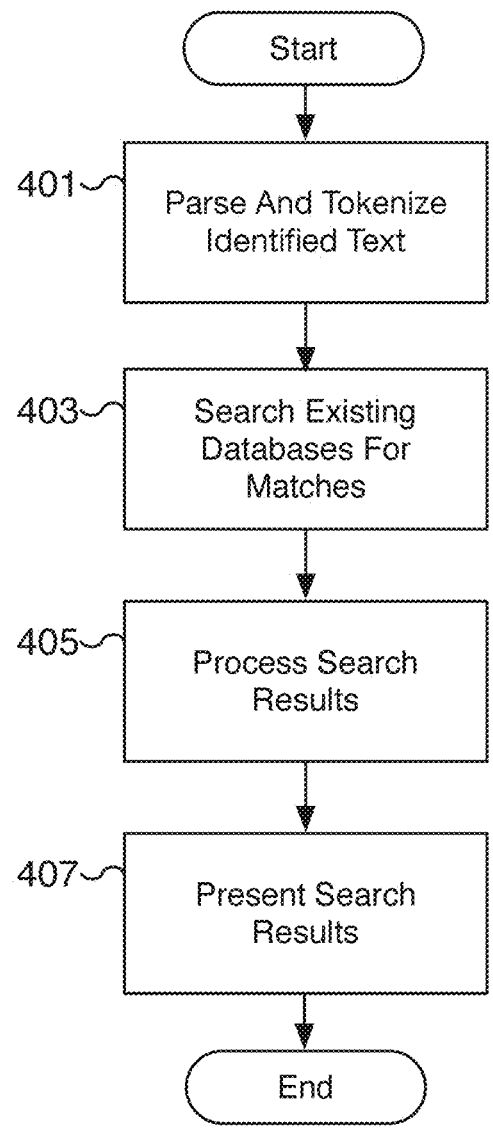
FIG. 4 is a flow chart illustrating an embodiment of a process for automatically generating a computer form application using reference data sources.

FIG. 4 is a flow chart illustrating an embodiment of a process for automatically generating a computer form application using reference data sources. For example, existing data sources such as existing databases and/or data stores are identified and linked to response fields for generating a computer form application. Linking reference sources to response fields allows for a more complex and accurate collection of user data. Similar responses from different users can be collapsed to reference the same reference entry in an existing data source. Moreover, responses can be matched and standardized across different computer form applications. For example, multiple computer form applications can share the same employee background information by referencing an employee's database table. As another example, multiple computer form applications can share the same customer contact database by referencing the same customers database. In some embodiments, the steps 401, 403, and/or 405 are performed at 309 of FIG. 3 and/or the step 407 is performed at 205 of FIG. 2.

At 401, identified text is parsed and tokenized. For example, tokens are created by parsing the text associated with a text label of a corresponding response field. In some embodiments, the tokens function as keywords used to identify matches from existing data sources. In some embodiments, the tokens are lemmatized and are associated with a set of matching strings. For example, in some embodiments, the tokens are associated with a thesaurus of matching keywords. The token for the text "employer" can be associated with the keywords "employer," "employers," "businesses," and "companies."

At 403, existing databases are searched for matches. For example, the processed tokens created from the text labels at 401 are used to search for matches amongst existing databases. The names and metadata of existing databases, their tables, and/or their fields are parsed and tokenized similar to the process performed at 401. For example, database table names are tokenized and the tokens can be lemmatized if necessary. The processed name and related information of existing databases are then compared with the processed tokens from step 401 to identify potential reference databases.

As one example, the matching strings for the token for the text "employer" can include the string keywords "employer," "employers," "businesses," and "companies." A table with the name "employees" matches one of the token string keywords. In some embodiments, only partial matches are needed and base string keywords are utilized. For example, the string keyword "compan" matches a table named "company" and a table named "companies." In some embodiments, the data types of the response fields and existing database fields are also compared to determine matches.

At 405, search results are processed. For example, the search results can be ranked based on best match. In various embodiments, different heuristics can be utilized to determine the ranking order. For example, the matches can be ranked by last used, most frequently used, best string match, or another appropriate ranking technique. In some embodiments, a best match is determined and set as a default match that an administrator can modify at 407 when presented with the results.

At 407, search results are presented. For example, a user interface view is presented to an administrator to display candidate references that match a response field. In some embodiments, an administrator selects from the candidate references to determine which reference should be mapped to a response field. In some embodiments, the candidates are presented from using a drop down list or another appropriate user interface component.

Figure 5:
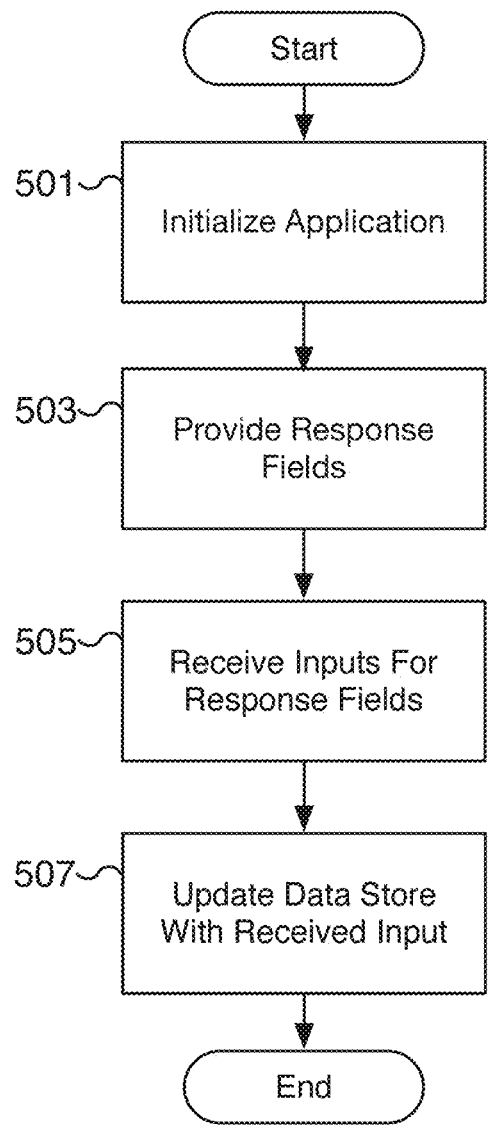
FIG. 5 is a flow chart illustrating an embodiment of a process for collecting form responses using an automatically generated computer form application.

FIG. 5 is a flow chart illustrating an embodiment of a process for collecting form responses using an automatically generated computer form application. For example, once an input document data is analyzed to generate a computer form application, the application is executed to collect user data. In various embodiments, the application has a client portion that interfaces with users and a data store portion. User data is collected from users via the client and stored using the data store portion. In some embodiments, the data store is a persistent computer storage such as a remote hosted data store. In some embodiments, the application includes a server portion such as a web server application portion that implements portions of the computer form application functionality. For example, the server portion may host a web application that is accessed by a client web browser. In some embodiments, the process of FIG. 5 is performed at 105 of FIG. 1.

At 501, the computer form application is initialized. For example, in some embodiments, one or more databases for form responses are created for storing user collected data. If existing tables are utilized, new fields in existing tables are created to support new user response fields not present in existing tables. In some embodiments, any referenced data sources based on existing data sources are confirmed to be functioning properly. In various embodiments, the initialization includes launching the application. For example, a web application version of the application can be launched on a web application server and appropriate UI components are instantiated. In some embodiments, the application is a mobile application, desktop application, kiosk application, and/or an application on another platform and is launched appropriately. For example, a mobile application can be launched by the user launching the mobile app.

In some embodiments, the user is provided with an invitation to access the generated computer form application. The invitation may include a network location to the application (such as a web link) and necessary login information. For example, a web application version of the form application can be accessed via a URL and may require additional login information such as a username and/or password. In some embodiments, a unique URL is utilized for each user. In various embodiments, the URL and required information to access the computer form is provided to each user, for example, via email, text message, instant messaging, and/or another communication mechanism.

At 503, response fields are provided to the user. For example, the user accesses the application and is displayed a user interface view. The user interface view includes response fields for inputting user data. In various embodiments, the view includes response field descriptions based on the corresponding text labels of the response views. For example, the text "Name of Candidate:" is displayed next to the response field for collecting a user's name. In some embodiments, the non-response field data is also included in the view. For example, a header and/or company logos, general instructions, etc. are also displayed as part of the view. In various embodiments, the view visually resembles the original form from which the computer form was automatically generated from.

At 505, inputs for response fields are received. For example, the input entered by the user and collected by the computer form application is received. In some embodiments, the data must be verified before it can be received. For example, in some embodiments, the input data must match the data type of the response field. As one example, a date of birth response field can only receive a date as input. In some embodiments, a date of birth response cannot be a date in the future. As another example, a body temperature response can be verified to fall within a certain reasonable temperature range for a human. Similarly, a distance travelled for mileage reimbursement field must fall within a valid range. For example, a negative distance would not be valid. As yet another example, an email response field can only receive a valid email address. In some embodiments, the received data is verified by comparing the data to the type of data expected by the data store. For example, in the event a response field is linked to a reference data source, the user's response may be required to match an existing entry in the reference data source. For example, a university response field may only allow a university name that already exists as a known university name in the reference data source.

At 507, the data store is updated with the received user input. For example, user data collected from the response fields at 505 is stored in a persistent data storage. In various embodiments, the persistent data storage is a remote database and/or a cloud-hosted data store. In some embodiments, the data is stored across multiple data stores and/or references data using reference data stores.

Figure 6:
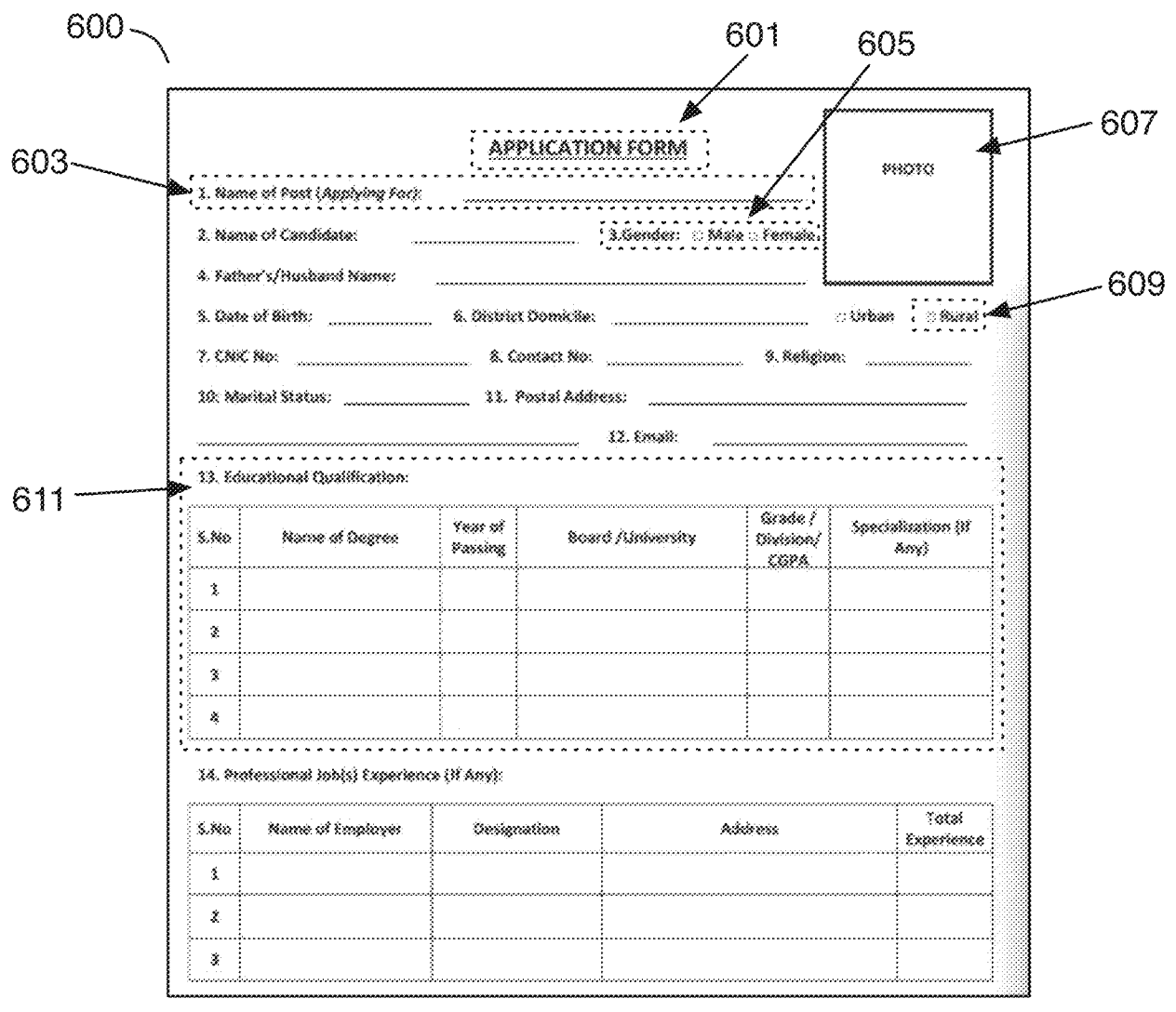

FIG. 6 is a diagram illustrating an example of a physical form document. In some embodiments, physical form document 600 is a form document provided to multiple users for collecting user data. In the example shown, physical form document 600 includes only a portion of the physical document and may include additional response fields and document components not shown. As shown in FIG. 6, physical form document 600 includes multiple document components including components 601, 603, 605, 607, 609, and 611. Additional components are not labeled but are identified during analysis of physical form document 600 when generating a computer form application of the document. In the example shown, component 601 is a header component and a non-response field component. Header component 601 includes the text "APPLICATION FORM" and corresponds to a title for physical form document 600. As a non-response field component, header component 601 does not have a corresponding response field.

In the example of FIG. 6, components 603, 605, 607, 609, and 611 are each associated with a response field and each includes both a response field and corresponding text label. For example, component 603 includes a blank response field and a corresponding text label ("1. Name of Post (Applying For):"). Component 605 includes a selection checkmark target (or checkbox) response field with possible values "Male" and "Female" and a corresponding text label ("3.Gender:"). Component 607 includes a photo response field and a corresponding text label ("PHOTO"). Component 609 includes a checkmark target response field and a corresponding text label ("Rural"). Component 611 is a table and with a corresponding text label ("13. Educational Qualification:"). Each table entry in table component 611 includes multiple response fields and corresponding text labels, such as "S.No," "Name of Degree," "Year of Passing," "Board/University," "Grade/Division/CGPA," and "Specialization (If Any)." In the example of physical form document 600, table component 611 allows a user to include four entries. In various embodiments, physical form document 600 is digitized and converted to an input document data. Using the processes of FIGS. 1-5, a computer form document is automatically created based on an input document data of physical form document 600.

Although physical form document 600 is a custom form, the techniques described herein apply to any forms including standard forms such as government published forms. For example, a standard income tax form can be processed using the processes of FIGS. 1-5 to create a custom form application. References to fields such as names, addresses, etc. can be linked to existing reference databases such as an employee information database. In various embodiments, the application of the techniques can be applied to a combination of standard and custom forms and allows the data entered into any of the forms to reference one another.

FIG. 7 is a diagram illustrating an embodiment of an administrator user interface for creating a digital form application. In the example shown, user interface 700 displays identified response fields and corresponding text labels for a form document, including at least response fields 701, 703, and 705. In some embodiments, the form document analyzed and displayed in user interface 700 corresponds to physical form document 600. In the example shown, only a portion of the analyzed components of physical form document 600 are shown. In various embodiments, user interface 700 is presented to an administrator to modify and/or verify form document components before generating a computer form application with the verified components. In some embodiments, user interface 700 is displayed at 203 of FIG. 2 and/or at 407 of FIG. 4. In some embodiments, the response fields are modified by an administrator at 205 of FIG. 2.

In various embodiments, user interface 700 is displayed to an administrator once response fields and corresponding text labels of a form document have been identified. The data types of the response fields have been determined and potential relationships to existing data sources are presented. For example, response field 701 corresponds to document component 603 of FIG. 6. As shown in user interface 700, response field 701 is configured to receive a text (string) data type. Additional configuration fields include a mandatory field, a potential reference field, and an include column field.

In some embodiments, a mandatory field determines whether the response must be completed or whether the form can be submitted with the field left blank. The reference type associated with the response field is used to reference a data source such as another database table. The referenced database table can be part of the same database used for the storing entries for the associated form document or an external reference database. For example, as shown in user interface 700, response field 703 corresponds to document component 605 of FIG. 6 and is a reference data type. The reference type is configured to "gender_218_list," which is a database table separate (or external) from the database table used for the non-reference type entries. In some embodiments, the reference table may be part of the same database or part of another database. As another example, response field 705 corresponds to document component 609 of FIG. 6 and is also a reference data type. The reference type is configured to "none" which directs the computer application generation to create a new database table for response field 705 instead of referencing an existing database table. For each response field, an include column field is also displayed. The include column field allows the administrator to include or not include the response field in the generated computer form application.

FIG. 8 is a diagram illustrating an embodiment of an administrator user interface for creating a table in a digital form application. In the example shown, user interface 800 displays an identified table analyzed from a form document and the corresponding response fields for the identified table. In some embodiments, the form document analyzed and displayed in user interface 800 corresponds to physical form document 600. In the example shown, only the portion of physical form document 600 corresponding to table document component 611 is shown. In various embodiments, user interface 800 is presented to an administrator to modify and/or verify form document components before generating a computer form application with the verified components. In some embodiments, user interface 800 is displayed at 203 of FIG. 2 and/or at 407 of FIG. 4. In some embodiments, the response fields are modified by an administrator at 205 of FIG. 2.

In various embodiments, user interface 800 is displayed to an administrator once response fields and corresponding text labels of a table within a form document have been identified. In the example shown, five candidate reference tables are identified and the one selected has the table name "Educational Qualification Table 2020s." In various embodiments, an administrator can switch between different reference tables. The response fields for each table entry are also displayed in user interface 800. For example, response fields corresponding to "S. No," "Name of Degree," "Year of Passing," "Board or University," "Grade or Division or CGPA," and "Specialization (If Any)" fields are shown along with their configuration parameters such as configurations for the data type, mandatory, reference, and include column fields.

Figure 9A:
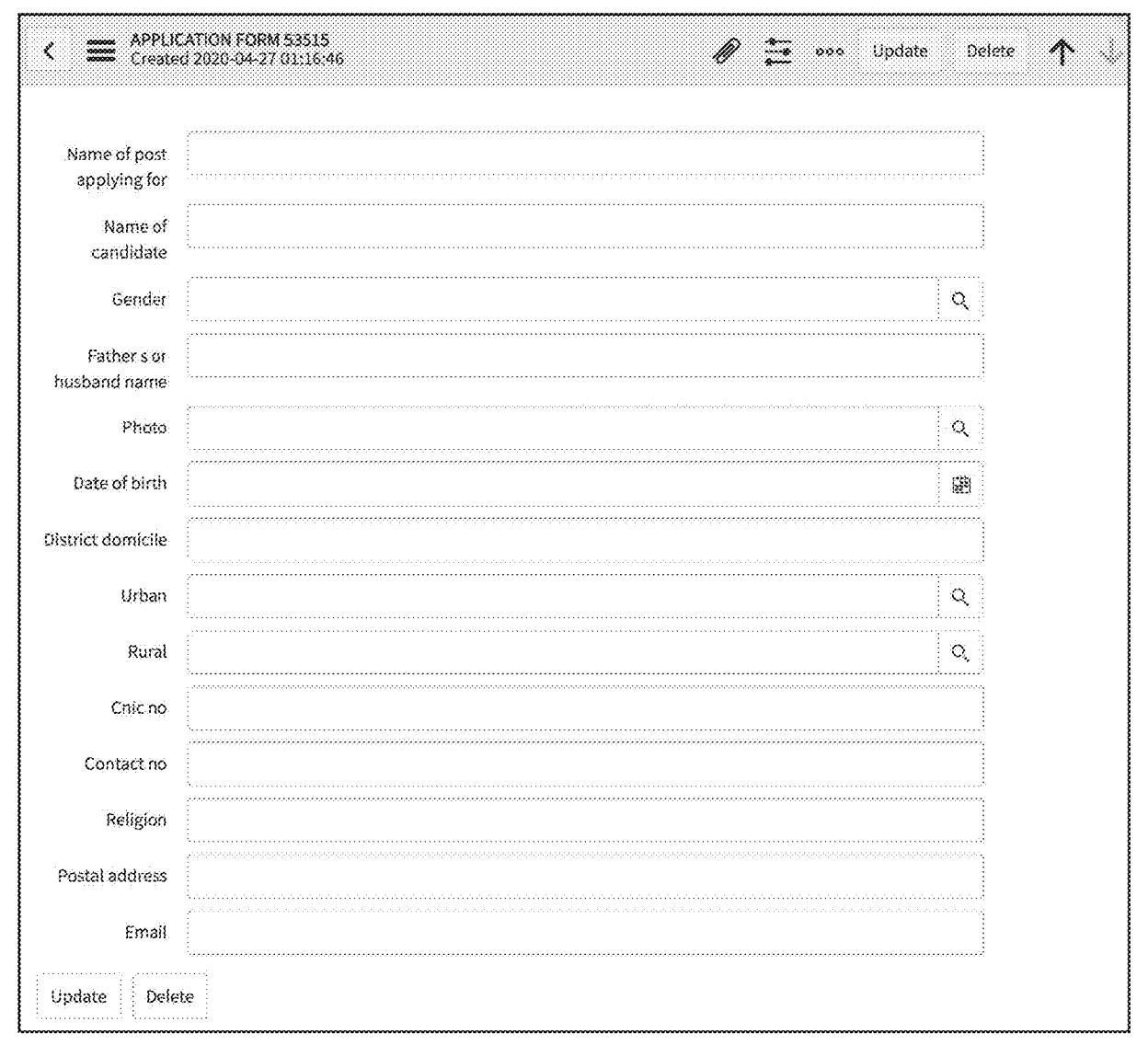
Figure 9B:
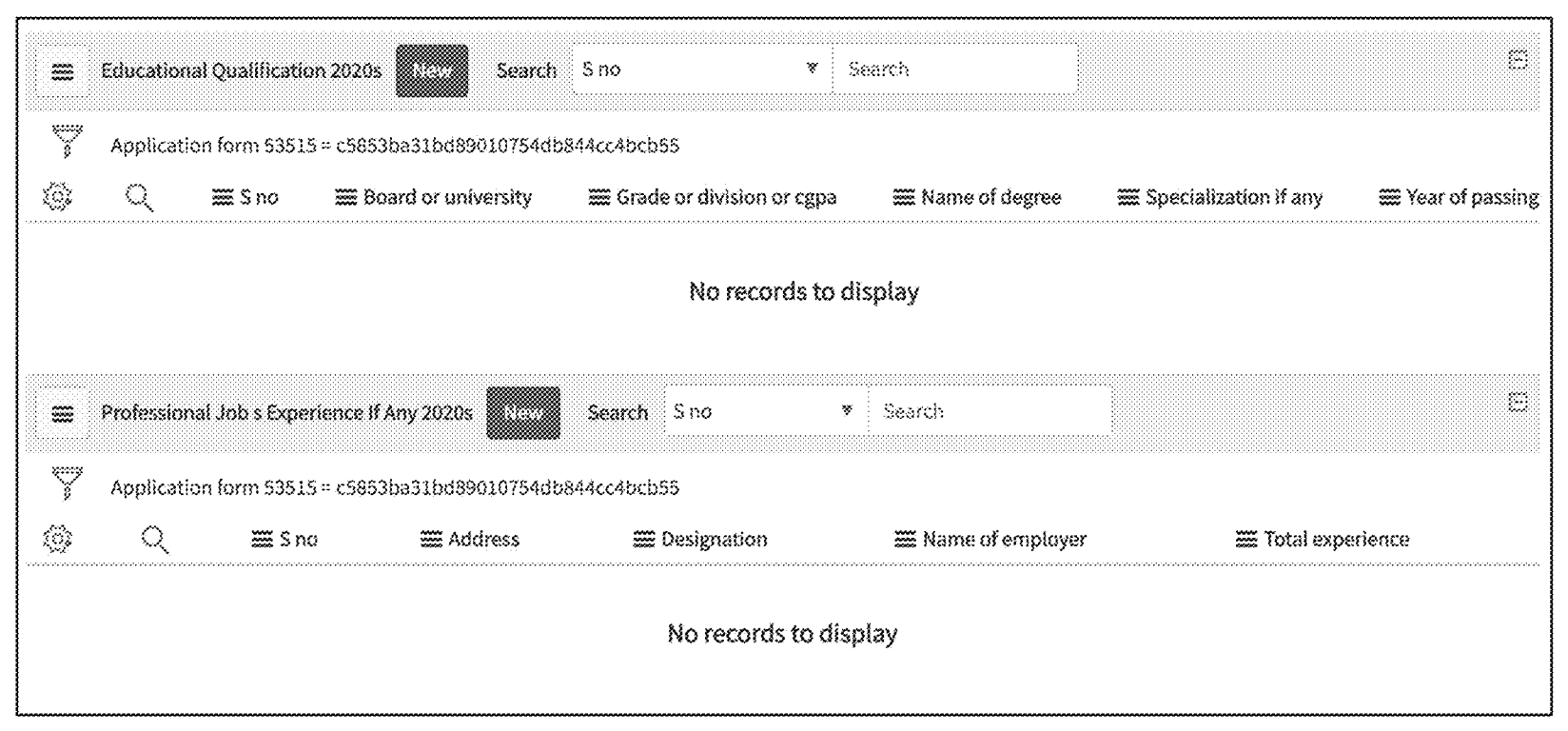

FIGS. 9A and 9B are diagrams illustrating an embodiment of a user interface for an automatically generated computer form application. FIG. 9A represents the top portion of the user interface and FIG. 9B represents the bottom portion of the user interface. In some embodiments, the user interface of FIGS. 9A and 9B is displayed by an automatically generated computer form application to a user for collecting user data. In some embodiments, the computer form application corresponds to physical form document 600 of FIG. 6 and/or an analyzed and validated form with corresponding response fields and text labels of FIGS. 7 and 8. In some embodiments, the computer form application shown in FIGS. 9A and 9B is generated using the processes of FIGS. 1-5 and is displayed to a user at 105 of FIG. 1 and/or at 503 of FIG. 5. Utilizing the shown user interface, users can input user data based on a custom form document that is collected and stored at a persistent data storage.

In the example shown, FIG. 9A depicts the implementation of different user interface components for different response fields with different data types. For example, user interface components for "Gender," "Urban," and "Rural" response fields each include a magnifying glass to reveal a binary selection and each corresponds to a checkmark target (or checkbox) in the corresponding physical form. In some embodiments, the checkmark target (or checkbox) can be implemented with a different binary selection user interface component such as a binary selection box. The "Photo" response field allows the user to select a binary file such as a digital image to upload a photo. In some embodiments, the "Photo" user interface response field allows the user to explore an existing set of photos, such as a database of the user's photos. The "Date of birth" response field requires the user enter a valid date using a date selection user interface component. Other response fields allow the user to enter text such as the name of the candidate. In the example of FIG. 9B, two table document components are shown, one for entering educational qualifications and one for entering professional experience. Also shown are the references to existing database tables "Educational Qualifications 2020s" and "Professional Job s Experience If Any 2020s," respectively. The corresponding table user interface components allow multiple entries to be added to each respective table document section using the referenced database tables. In the example shown, each table entry includes multiple fields as required by the corresponding physical form document.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving an input document data;
   analyzing the document data to automatically identify one or more response fields and one or more corresponding text labels laid out in the input document data;
   for a select response field in the one or more response fields, automatically determining a data type for the select response field based at least in part the corresponding text label of the identified text labels and for the select response field using the corresponding text label to automatically identify possible response values from an existing data source database, and automatically constraining an eligible response to the select response field as a selection among the automatically identified possible response values;
   for the one or more response fields, searching a plurality of different preexisting database tables using one or more tokens identified from parsing at least a portion of the one or more corresponding text labels, and based on a result of the search of the plurality of different preexisting database tables, automatically linking at least a portion of the one or more response fields and the corresponding text labels to one or more corresponding ones of the preexisting database tables for use in handling at least the portion of the one or more response fields including by ranking matches from results of the searching of the plurality of different preexisting database tables using at least a portion of the tokens, wherein a plurality different form applications are linked to the plurality of different preexisting database tables in a manner that tracks a same reference entry of the plurality of different preexisting database tables being referenced by different response fields from the plurality different form applications; and automatically generating an application configured to provide to users the one or more response fields and the one or more corresponding text labels and receive inputs to the response fields from the users that are recorded in a persistent computer storage.

2. The method of claim 1, wherein the analyzing of the document data includes identifying shape outlines corresponding to each one of the one or more response fields.

3. The method of claim 2, wherein identifying the shape outlines includes determining a local maxima corresponding to each angle of each of the shape outlines.

4. The method of claim 1, wherein the input document data is a digitized version of a physical form document.

5. The method of claim 1, further comprising determining a data type for each of a plurality of response fields included in the one or more automatically identified response fields.

6. The method of claim 5, wherein the determined data type is an address component, a date component, or a time component data type.

7. The method of claim 6, wherein the address component data type includes a street number, a street name, a city, a county, a state, a country, or a continent component.

8. The method of claim 6, wherein the time component data type includes an hour, minute, second, millisecond, or time zone component.

9. The method of claim 5, wherein one of the automatically identified one or more response fields references an existing data store.

10. The method of claim 9, wherein the existing data store is a database table in a cloud-hosted database.

11. The method of claim 5, wherein the determined data type is a text string, a currency, a temperature, a weight, or a distance data type.

12. The method of claim 1, wherein a second select one of the automatically identified one or more response fields is a single exclusive multiple-choice selection, a non-exclusive multiple-choice selection, or a ranked selection response field.

13. The method of claim 1, further comprising analyzing the document data to automatically identify one or more non-response field document components.

14. The method of claim 13, wherein the one or more automatically identified non-response field document components correspond to a header, a text description, an image, or a photo.

15. The method of claim 13, further comprising generating a view of the application using the one or more automatically identified non-response field document components.

16. The method of claim 1, further comprising analyzing the document data to automatically identify a table document component that includes one or more of the automatically identified one or more response fields and one or more of the automatically identified one or more corresponding text labels.

17. The method of claim 1, further comprising generating an invitation to access the application, wherein the invitation includes a unique Uniform Resource Locator (URL) for each user.

18. The method of claim 1, wherein automatically identifying the possible response values from the existing data source database includes searching the existing data source database using the text label corresponding to the select response field.

19. A system, comprising:
a processor; and
a memory coupled to the processor, wherein the memory is configured to provide the processor with instructions which when executed cause the processor to:
receive an input document data;
analyze the document data to automatically identify one or more response fields and one or more corresponding text labels laid out in the input document data;
for a select response field in the one or more response fields, automatically determine a data type for the select response field based at least in part the corresponding text label of the identified text labels and for the select response field using the corresponding text label to automatically identify possible response values from an existing data source database, and automatically constrain an eligible response to the select response field as a selection among the automatically identified possible response values;
for the one or more response fields, search a plurality of different preexisting database tables using one or more tokens identified from parsing at least a portion of the one or more corresponding text labels, and based on a result of the search of the plurality of different preexisting database tables, automatically link at least a portion of the one or more response fields and the corresponding text labels to one or more corresponding ones of the preexisting database tables for use in handling at least the portion of the one or more response fields including by ranking matches from results of the searching of the plurality of different preexisting database tables using at least a portion of the tokens, wherein a plurality different form applications are linked to the plurality of different preexisting database tables in a manner that tracks a same reference entry of the plurality of different preexisting database tables being referenced by different response fields from the plurality different form applications; and
automatically generate an application configured to provide to users the one or more response fields and the one or more corresponding text labels and receive inputs to the response fields from the users that are recorded in a persistent computer storage.

20. A computer program product, the computer program product being embodied in a non-transitory computer readable storage medium and comprising computer instructions for:
receiving an input document data;
analyzing the document data to automatically identify one or more response fields and one or more corresponding text labels laid out in the input document data;
for a select response field in the one or more response fields, automatically determining a data type for the select response field based at least in part the corresponding text label of the identified text labels and for the select response field using the corresponding text label to automatically identify possible response values from an existing data source database, and automatically constraining an eligible response to the select response field as a selection among the automatically identified possible response values;

for the one or more response fields, searching a plurality of different preexisting database tables using one or more tokens identified from parsing at least a portion of the one or more corresponding text labels, and based on a result of the search of the plurality of different preexisting database tables, automatically linking at least a portion of the one or more response fields and the corresponding text labels to one or more corresponding ones of the preexisting database tables for use in handling at least the portion of the one or more response fields including by ranking matches from results of the searching of the plurality of different preexisting database tables using at least a portion of the tokens, wherein a plurality different form applications are linked to the plurality of different preexisting database tables in a manner that tracks a same reference entry of the plurality of different preexisting database tables being referenced by different response fields from the plurality different form applications; and automatically generating an application configured to provide to users the one or more response fields and the one or more corresponding text labels and receive inputs to the response fields from the users that are recorded in a persistent computer storage.

* * * * *